United States Patent
Ozaki (10) Patent No.: US 9,031,724 B2
(45) Date of Patent: May 12, 2015

(54) ELECTRIC AUTOMOBILE

(75) Inventor: Takayoshi Ozaki, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/000,783

(22) PCT Filed: Feb. 10, 2012

(86) PCT No.: PCT/JP2012/053062
§ 371 (c)(1),
(2), (4) Date: Aug. 21, 2013

(87) PCT Pub. No.: WO2012/114903
PCT Pub. Date: Aug. 30, 2012

(65) Prior Publication Data
US 2013/0338866 A1    Dec. 19, 2013

(30) Foreign Application Priority Data

Feb. 25, 2011    (JP) .................................. 2011-039856

(51) Int. Cl.
*B60L 9/18* (2006.01)
*B60L 15/20* (2006.01)
*B60L 3/00* (2006.01)
(Continued)

(52) U.S. Cl.
CPC .............. *B60L 15/20* (2013.01); *Y02T 10/642* (2013.01); *B60L 3/0061* (2013.01); *B60L 15/10* (2013.01); *B60L 2240/421* (2013.01); *B60L 2240/423* (2013.01); *Y02T 10/7275* (2013.01)

(58) Field of Classification Search
CPC ... B60L 3/0061; B60L 3/0038; B60L 3/0092; B60L 15/20; B60L 2240/423; B60L 2240/429; B60K 7/0007; B60W 50/023; B60W 50/029; B60W 50/045; H02P 29/021; H02P 29/022
USPC ................. 701/22; 180/65.285; 318/151, 490
See application file for complete search history.

(56) References Cited

U.S. PATENT DOCUMENTS 5,304,912 A * 4/1994 Kajiwara et al. ............... 318/802
7,482,769 B2 * 1/2009 Kutsuna et al. ............ 318/254.1
(Continued)

FOREIGN PATENT DOCUMENTS

JP    07-111708    4/1995
JP    10-14300    1/1998
(Continued)

OTHER PUBLICATIONS

JP 2000-166007 machine generated English translation.*
(Continued)

*Primary Examiner* — Tan Q Nguyen (57) ABSTRACT

An electric vehicle includes a motor unit configured to drive a wheel, an ECU and an inverter unit. A motor control circuitry of the inverter unit includes a rotational frequency controller operable to perform rotational frequency control. The electric vehicle also includes a torque control abnormalities detector configured to detect an abnormality of torque control performed by the motor control circuitry. The electric vehicle also includes a control mode switcher configured to, in response to determination by the torque control abnormalities detector that there is an abnormality of torque control, cause the motor control circuitry to switch from torque control to rotational frequency control performed by the rotational frequency controller.

6 Claims, 6 Drawing Sheets

(51) Int. Cl.
  *B60L 15/10*  (2006.01)
  *B60W 50/023*  (2012.01)

(56) References Cited

U.S. PATENT DOCUMENTS

| | | | |
|---|---|---|---|
| 8,174,224 B2 * | 5/2012 | Chakrabarti et al. | 318/432 |
| 8,232,756 B2 | 7/2012 | Yoshihara et al. | |
| 2009/0133947 A1 | 5/2009 | Yoshihara et al. | |
| 2010/0295500 A1 * | 11/2010 | Chakrabarti et al. | 318/812 |
| 2011/0011203 A1 * | 1/2011 | Yamamoto et al. | 74/606 A |
| 2011/0133541 A1 * | 6/2011 | Makino et al. | 301/6.5 |
| 2011/0288699 A1 * | 11/2011 | Jang et al. | 701/22 |

FOREIGN PATENT DOCUMENTS

| | | | | |
|---|---|---|---|---|
| JP | 2000-166007 | | 6/2000 | |
| JP | 2000-166007 A | * | 6/2000 | B60L 9/18 |
| JP | 2002-186270 | | 6/2002 | |
| JP | 2005-143266 | | 6/2005 | |
| JP | 2008-168790 | | 7/2008 | |
| JP | 2008-172935 | | 7/2008 | |
| JP | 2009-131043 | | 6/2009 | |

OTHER PUBLICATIONS

PCT International Preliminary Report on Patentability mailed Sep. 6, 2013 in corresponding International Application No. PCT/JP2012/053062.

U.S. Appl. No. 14/000,373, filed Aug. 19, 2013, Takayoshi Ozaki, NTN Corporation.

U.S. Appl. No. 13/985,925, filed Aug. 16, 2013, Takayoshi Ozaki, NTN Corporation.

U.S. Appl. No. 14/000,364, filed Aug. 19, 2013, Takayoshi Ozaki, NTN Corporation.

U.S. Appl. No. 14/000,379, filed Aug. 19, 2013, Takayoshi Ozaki, NTN Corporation.

U.S. Appl. No. 14/000,295, filed Aug. 19, 2013, Takayoshi Ozaki, NTN Corporation.

Japanese Office Action issued Jun. 10, 2014 in corresponding Japanese Patent Application No. 2011-039856.

International Search Report mailed May 1, 2012 in corresponding International Application No. PCT/JP2012/053062.

\* cited by examiner

ELECTRIC AUTOMOBILE

CROSS REFERENCE TO THE RELATED APPLICATIONS

This application is a U.S. national stage application of PCT/JP2012/053062 filed Feb. 10, 2012 and claims the foreign priority benefit of Japanese patent application No. 2011-039856, filed Feb. 25, 2011, the entire disclosures of which are herein incorporated by reference as a part of this application.

BACKGROUND OF THE INVENTION

1. Field of the Invention

The present invention relates to an electric vehicle, such as an in-wheel motor vehicle, that is equipped with motor(s) to drive wheels and that may be battery-powered or fuel cell-powered.

2. Description of Related Art

An electric vehicle may experience malfunctions of a motor serving as a drive for the vehicle and/or malfunctions of a control system that controls the motor. This can significantly affect the travel performance or travel safety.

An electric vehicle may include a drive system which may be in the form of an in-wheel motor drive system. The components of an in-wheel motor drive system may include a wheel bearing, a reducer and a motor. Reliability of a motor, a wheel bearing and a reducer is an urgent concern for such an in-wheel motor drive system which, due to its smaller size, involves rapid rotation of the motor, and etc.

In the past, in the attempt to ensure such reliability, an in-wheel motor drive system has been proposed in which the temperature of components such as a wheel bearing, a reducer and a motor may be measured and monitored for overload, with features to limit a drive current in/to the motor or a rotational frequency of the motor according to the temperature measurements (see the Patent Document 1 listed below).
[Patent Document 1] JP Laid-open Patent Publication No. 2008-168790

SUMMARY OF THE INVENTION

As noted above, an in-wheel motor drive system may be configured such that the temperature of components such as a motor is measured and monitored for overload, in order to correspondingly limit the driving of the motor. However, control based on temperature measurements may not provide a solution to a situation where there is a failure of torque control that may be caused by a damage to a sensor that senses a motor current.

An object of the present invention is to provide an electric vehicle which enables appropriate measures or actions to be quickly taken when there is a failure of torque control of a motor unit. The general aspects of the present invention will now be described using the reference signs in the figures showing embodiments of the present invention.

The present invention may provide an electric vehicle which includes a motor unit 6 configured to drive a wheel 2. The electric vehicle also includes an ECU 21 which is an electronic control unit configured to perform general control of the vehicle. The electric vehicle also includes an inverter unit 22. The inverter unit 22 includes a power circuitry 28 including an inverter 31 configured to convert a DC power into an AC power used to drive the motor unit 6. The inverter unit 22 also includes a motor control circuitry 29 configured to control at least the power circuitry 28 in accordance with control from the ECU 21. The ECU 21 is configured to send to the inverter unit 22 a torque command value that causes the motor unit 6 to be driven. The motor control circuitry 29 of the inverter unit 22 is operable to perform torque control. The electric vehicle also includes a rotational frequency controller 37 operable to perform rotational frequency control. The motor control circuitry 29 includes the rotational frequency controller 37. The electric vehicle also includes a torque control abnormalities detector 38 configured to detect an abnormality of torque control performed by the motor control circuitry 29. The electric vehicle also includes a control mode switcher 39 configured to, in response to determination by the torque control abnormalities detector 38 that there is an abnormality of torque control, cause the motor control circuitry 29 to switch from torque control to rotational frequency control performed by the rotational frequency controller 37.

In the aforementioned configuration, during a normal operation of the driving of the electric vehicle, the motor control circuitry 29 may perform torque control based on a torque command value that may be produced from the ECU 21. The torque control abnormalities detector 38 may be ready at any time to detect an abnormality of torque control. The control mode switcher 39 may, in response to determination by the torque control abnormalities detector 38 that there is an abnormality of torque control, cause the motor control circuitry 29 to switch from torque control to rotational frequency control performed by the rotational frequency controller 37. In particular, the torque control abnormalities detector 38 may be configured to determine that there is an abnormality of torque control, if there is a failure of torque control due to, for example, a damage to a current sensor 35 configured to sense a motor current. The control mode switcher 39 may, in response to such a determination, cause the motor control circuitry 29 to switch from torque control to rotational frequency control. In this way, appropriate measures or actions can be quickly taken when there is a failure of torque control.

The torque control abnormalities detector 38 may be configured to determine that there is an abnormality of torque control, if a measurement of a motor current for a given torque command value produced from the ECU 21 falls outside a predefined range for the given torque command value. Such a predefined range may be determined in the following procedures:

For example, a measurement of a motor current for a given torque command value that may be produced from the ECU 21 during a normal operation may be obtained in advance through experiments and/or simulations. Such a measurement may be defined as a reference value for the given torque command value. The predefined range for a given torque command value may be determined as a range of possible measurements of a motor current for the given torque command value, outside which there is too much deviation from the reference value to perform proper torque control.

A target value generator 43 may further be provided which is configured to generate a target value, with the target value indicating a rotational frequency of the motor unit that is the latest as of when the motor control circuitry 29 is caused to switch from torque control to rotational frequency control, wherein the rotational frequency controller 37 may be configured to perform feedback control of rotational frequency based on a deviation between the target value and a detection value as derived from a sensor 36 configured to determine rotational frequency of the motor unit. Thus, the rotational frequency controller 37 may perform rotational frequency control in such a way to bring the aforementioned detection value as derived from the sensor 36 closer to the target value.

In other words, the rotational frequency controller 37 may controllably adjust rotational frequency of the motor unit to that of the motor unit as measured during a normal operation when torque control is performed.

A drive decrementor 45 may further be provided which is configured to gradually reduce torque or rotational frequency of all of the motor units 6 of the vehicle, after switching from torque control to rotational frequency control performed by the rotational frequency controller 37 is carried out. The drive decrementor 45 may, in response to an abnormality, gradually reduce torque or rotational frequency of the motor units 6, thus allowing a driver to, for example, continue driving the vehicle to some place where the vehicle can be fixed. Then, the electric vehicle may be repaired so as to be ready to perform torque control.

The inverter unit 22 may include an abnormalities notifier 41 configured to send to the ECU 21 a notification of abnormalities of the motor unit 6, if the motor control circuitry 29 is caused to switch from torque control to rotational frequency control. The ECU 21 performs general, integrated control of the vehicle. Thus, by sending to the ECU 21 a notification of abnormalities of torque control if the torque control abnormalities detector 38 detects an abnormality of torque control, the ECU 21 can correspondingly perform an appropriate control of the vehicle in general. Also, the ECU 21 is an upper-level control unit which may send a drive command to the inverter unit 22. Thus, an urgent control performed by the inverter unit 22 may be followed by a more appropriate control of drive which is performed by the ECU 21.

A wheel bearing unit 4 and a reducer unit 7 may further be provided, wherein the motor unit 6, together with the wheel bearing unit 4 and the reducer unit 7, may form an in-wheel motor drive system 8 that is partly or entirely disposed within the wheel 2. Reliability of the wheel bearing unit 4, the reducer unit 7 and the motor unit 6 is an urgent concern for an in-wheel motor drive system 8 which, due to its smaller size, involves rapid rotation of the motor unit 6, and etc. Switching, if there is a failure of torque control of at least one motor unit 6, from torque control to rotational frequency control of the at least one motor unit 6, can prevent abrupt stopping of the driving of the at least one motor unit 6, thus allowing a driver to, for example, continue driving the vehicle to some place where the vehicle can be fixed. Then, the electric vehicle may be repaired so as to be ready to perform torque control.

A reducer unit 7 may be provided which is configured to produce rotation with a speed that is reduced with respect to that of rotation of the motor unit 6, wherein the reducer unit 7 may comprise a cycloidal reducer. Such a configuration in which the reducer unit 7 comprises a cycloidal reducer having, for example, a reduction ration of 1/6 or greater, allows for the provision of a smaller motor unit 6, thus achieving reduction in dimensions of the system or assembly. With such a significant reduction ratio, a smaller motor unit 6 may involve rapid rotation. Even when a failure of torque control of a motor unit 6 occurs during rapid rotation of the motor unit 6, the motor control circuitry 29 may be caused to switch from torque control to rotational frequency control, thus preventing problems such as abrupt stopping of the driving of the motor unit 6.

The present invention encompasses any combination of at least two features disclosed in the claims, the specification and/or the drawings. In particular, the present invention encompasses any combination of at least two claims.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, as defined by the appended claims. In the accompanying drawings, like reference numerals are used to denote like parts throughout the several views, and:

DESCRIPTION OF THE EMBODIMENTS

Figure 1:
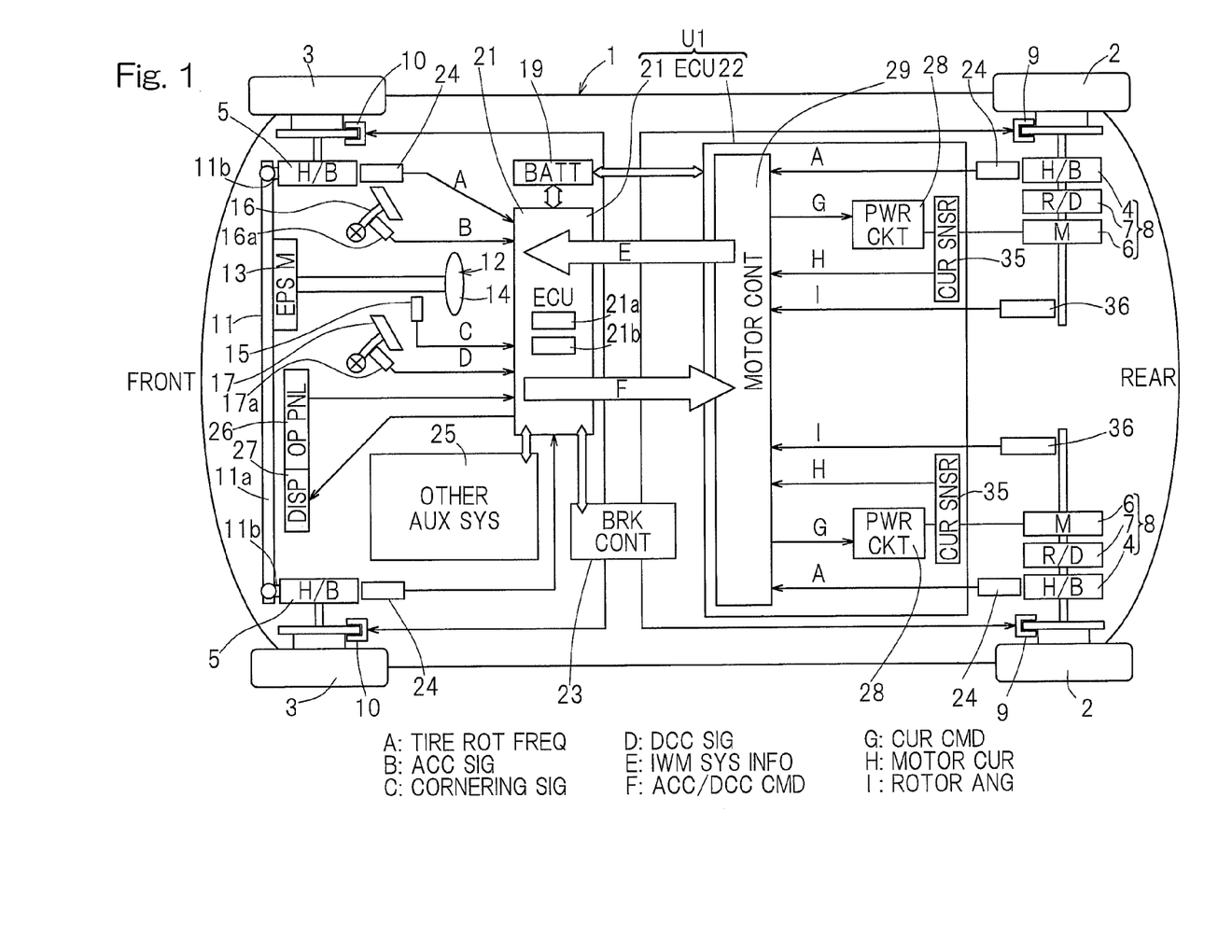
FIG. 1 is a block diagram of a schematic configuration of an electric vehicle, as viewed from top, according to an embodiment of the present invention.

An electric vehicle according to an embodiment of the present invention will now be described in connection with FIG. 1 to FIG. 9. The electric vehicle such as shown in FIG. 1 is a four-wheel vehicle that includes a vehicle body 1 with left and right rear wheels 2 and left and right front wheels 3, with the rear wheels 2 being drive wheels and the front wheels 3 being steered driven wheels. The drive wheels 2 and the driven wheels 3, both equipped with tires, are supported by the vehicle body 1 via respective wheel bearing units 4, 5. In FIG. 1, the wheel bearing units 4, 5 are labeled with "H/B" which is an abbreviation for hub bearing. The left and right drive wheels 2, 2 are driven by respective independent traction motor units 6, 6. Rotation of a motor unit 6 is transmitted via a reducer unit 7 and a wheel bearing unit 4 to a wheel 2. The motor unit 6, the reducer unit 7 and the wheel bearing unit 4 are integrally assembled with each other to form an in-wheel motor drive system 8 that is partly or entirely disposed within the wheel 2. The in-wheel motor drive system 8 may be referred to as an in-wheel motor unit. The motor unit 6 may, without the interposition of the reducer unit 7, directly drive the wheel 2 into rotation. The wheels 2, 3 are equipped with respective electromechanical brakes 9, 10.

The left and right front steered wheels 3, 3 are turnable via a turning mechanism 11 and are steered with a steering mechanism 12. The turning mechanism 11 includes left and right knuckle arms 11b, 11b holding the respective wheel bearing units 5 and also includes a tie rod structure 11a configured to be laterally displaced to change the angles of the left and right knuckle arms 11b, 11b. The lateral movement of the turning mechanism 11 may be caused by a command from the steering mechanism 12, which drives an EPS (Electric Power Steering) motor 13, and via a rotary to linear motion converter mechanism (not shown). A steering angle sensor 15 is configured to sense a steering angle. The output of the steering angle sensor 15 is sent to the ECU 21 in which the sensed information may be used to generate an accelerating/decelerating command for left and right wheels.

A control system will be briefly discussed. A control system U1 as shown in FIG. 1 includes an ECU 21 which is an electronic control unit configured to perform general control of the vehicle and an inverter unit 22 configured to perform control of the traction motor units 6, 6 according to commands from the ECU 21. The vehicle body 1 is equipped with the ECU 21, the inverter unit 22, and a braking controller unit 23. The ECU 21 may include a computer, programs that may be executed by the computer, and various electronic circuits.

The ECU 21 may be generally divided, in terms of their functions, into a drive control subunit 21a and a general control subunit 21b. The drive control subunit 21a is configured to generate an accelerating/decelerating command, which will influence the traction motor units 6, 6 of the left and right wheels, based on an accelerating signal produced from an accelerator manipulation unit 16, a decelerating signal produced from a brake manipulation unit 17, and a cornering signal produced from the steering angle sensor 15, and to send the accelerating/decelerating command to the inverter unit 22. In addition, the drive control subunit 21a may be configured to correct the accelerating/decelerating command, based on information indicating the rotational frequency of tire(s) produced from rotation sensor(s) 24 that is/are operatively associated with the wheel bearing units 4, 5 for the respective wheels 2, 3 and/or information produced from various sensors that may be mounted to the vehicle. The accelerator manipulation unit 16 includes an accelerator pedal and a sensor 16a configured to sense the depression of the accelerator pedal to generate the aforementioned accelerating signal. The brake manipulator unit 17 includes a brake pedal and a sensor 17a configured to sense the depression of the brake pedal to generate the aforementioned decelerating signal.

The general control subunit 21b of the ECU 21 is configured to send the decelerating command produced from the brake manipulator unit 17 to the braking controller unit 23, control various auxiliary systems 25, process input signals from an operation panel 26 on a console, cause a display 27 to show information, and/or etc. Examples of the auxiliary systems 25 include an air conditioner, a lamp, a wiper, a GPS, and an airbag. In FIG. 1, the auxiliary systems 25 are indicated in general by a single block.

The braking controller unit 23 is configured to send a braking command to the brakes 9, 10 equipped to the wheels 2, 3, according to the decelerating command received from the ECU 21. Commands related to braking produced from the ECU 21 may include, other than commands generated based on the decelerating signal produced from the brake manipulator unit 17, a command generated by a safety enhancement subunit that may be included in the ECU 21. The braking controller unit 23 may also include an anti-lock-braking system. The braking controller unit 23 may include electronic circuits and/or a microcomputer.

The inverter unit 22 includes a power circuitry 28, which may be provided one for each of the motor units 6, and a motor control circuitry 29 configured to control the power circuitry/circuitries 28. A common motor control circuitry 29 may be provided for different power circuitries 28. Independent motor control circuitries 29 may be provided for respective different power circuitries 28. Such a common motor control circuitry 29 will be configured to control the different power circuitries 28 independently of each other, for example, to achieve different motor torques. The motor control circuitry 29 may be configured to send various information related to the in-wheel motor drive system 8 (which may be referred to as "IWM system information") held by the motor control circuitry 29, such as a variety of detected values or various control values, to the ECU.

Figure 2:
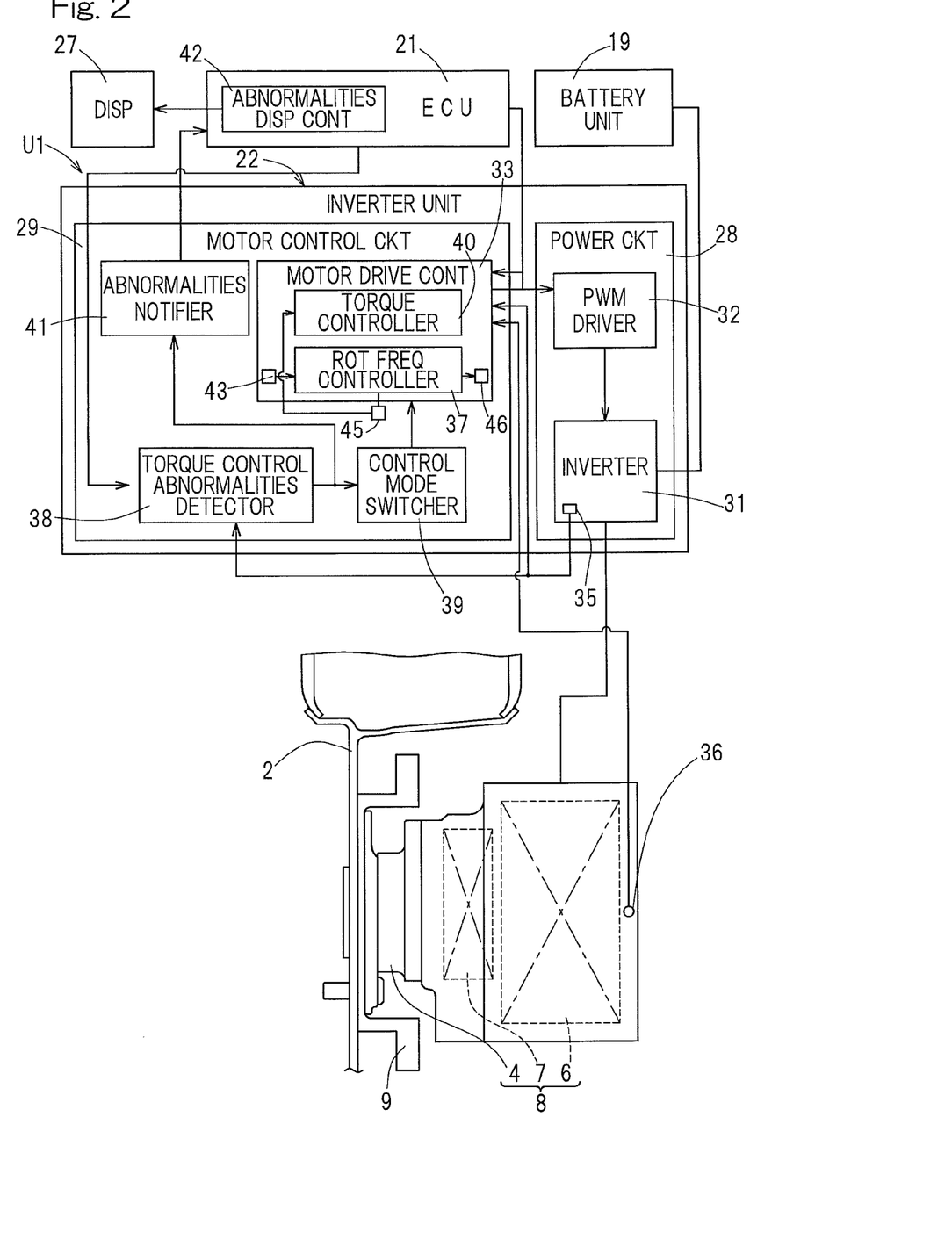
FIG. 2 is a block diagram of a schematic configuration of several features including an inverter unit for the electric vehicle.

FIG. 2 is a block diagram of a schematic configuration of several features including the inverter unit 22. The illustrated power circuitry 28 include an inverter 31 configured to convert a DC power from a battery unit 19 into a three-phase AC power used to drive the motor unit 6 and also include a PWM driver 32 configured to control the inverter 31. The motor unit 6 may include a three-phase synchronous motor. The inverter 31 may include a plurality of semiconductor switching devices (not shown). The PWM driver 32 may be configured to perform pulse width modulation on a received current command by generating ON/OFF commands to the semiconductor switching devices.

The motor control circuitry 29 may include a computer, programs that may be executed by the computer, and various electronic circuits. The motor control circuitry 29 may include a motor drive controller 33 which serves as a basic control component. The motor drive controller 33 may be configured to receive the accelerating/decelerating command such as a torque command from the ECU 21 which serves as an upper-level control unit, convert the accelerating/decelerating command into a current command, and send the current command to the PWM driver 32 of the power circuitry 28. The motor drive controller 33 may be configured to obtain a motor current that flows from the inverter 31 to the motor unit 6, with a current sensor 35, and perform a current feedback control. The motor drive controller 33 may be configured to obtain a rotational angle of the motor unit 6, with an angle sensor 36, and perform control based on the rotational angle, such as a vector control.

In the embodiment under discussion, the motor control circuitry 29 may include a rotational frequency controller 37, a torque control abnormalities detector 38, a control mode switcher 39 and an abnormalities notifier 41, and the ECU 21 may include an abnormalities display controller 42, as described below.

The motor drive controller 33 of the motor control circuitry 29 may include a torque controller 40 and a rotational frequency controller 37. The torque controller 40 may be configured to convert a torque command produced from the ECU 21 into a current command. The torque control abnormalities detector 38 may detect an abnormality of torque control performed by the motor control circuitry 29. During a normal operation, the motor control circuitry 29 may cause the torque controller 40 to perform torque control based on a torque command value produced from the ECU 21. The control mode switcher 39 may, if the torque control abnormalities detector 38 determines that there is an abnormality of torque control, cause the motor control circuitry 29 to switch from torque control to rotational frequency control performed by the rotational frequency controller 37.

Figure 5:
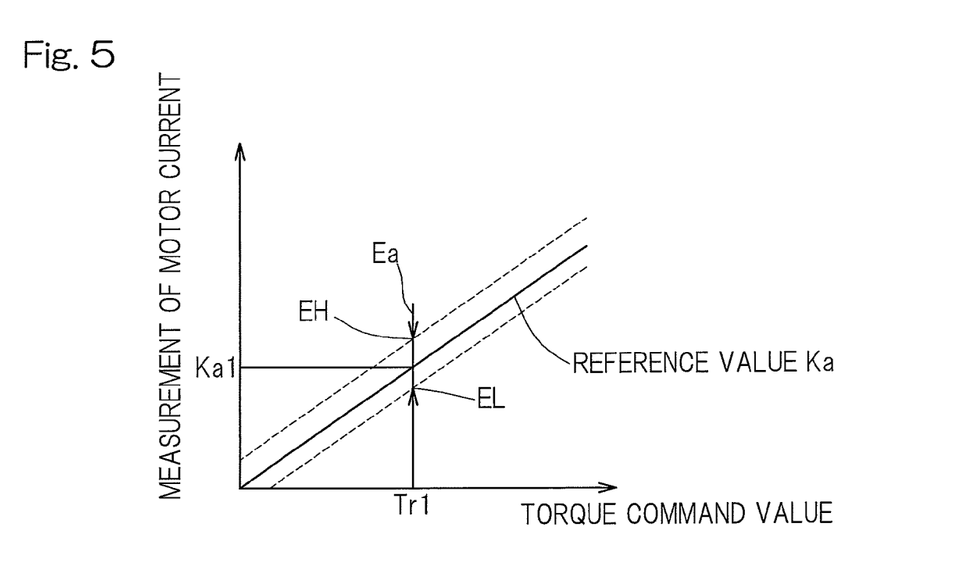
FIG. 5 is a characteristic diagram showing how a torque control abnormalities detector for the electric vehicle may determine an abnormality.

Referring to FIG. 5, the torque control abnormalities detector 38 may determine that there is an abnormality of torque control, if a measurement of a motor current for a given torque command value produced from the ECU 21 falls outside a predefined range Ea for the given torque command value. Such a "predefined range" Ea may be determined in the following procedures:

For example, a measurement of a motor current for a given torque command value produced from the ECU 21 during a normal operation may be obtained in advance through experiments and/or simulations. Such a measurement may be defined as a reference value Ka for the given torque command value. The predefined range for a given torque command value may be determined as a range between an upper limit EH and a lower limit EL for the given torque command value, the upper and lower limits EH, EL defining the limits of acceptable deviation from the reference value Ka for the given torque command value. A predefined range Ea that may be determined in this way may be stored in a memory (not shown) in a rewritable manner as a table. As shown in FIG. 5, the reference value Ka may increase in proportion with the torque command value produced from the ECU 21. A reference value Ka1 may be defined, in one-to-one corresponding relationship, with respect to a given torque command value Tr1. For instance, the torque control abnormalities detector 38 may determine that there is an abnormality of torque control, if a measurement of a motor current for a given torque command value Tr1 produced from the ECU 21—greater than a reference value Ka1 for the given torque command value Tr1—exceeds the upper deviation limit EH of a predefined range Ea for the given torque command value Tr1.

Similarly, the torque control abnormalities detector 38 may determine that there is an abnormality of torque control, if a measurement of a motor current for a given torque command value Tr1 produced from the ECU 21—lower than a reference value Ka1 for the given torque command value Tr1—is below the lower deviation limit EL of a predefined range Ea for the given torque command value Tr1.

Thus, the torque control abnormalities detector 38 may determine that there is an abnormality of torque control, if there is too much deviation of a measurement of a motor current from a reference value Ka for a given torque command value to perform proper torque control. The torque control abnormalities detector 38 may be configured to obtain a measurement of a motor current with the current sensor 35.

Figure 3:
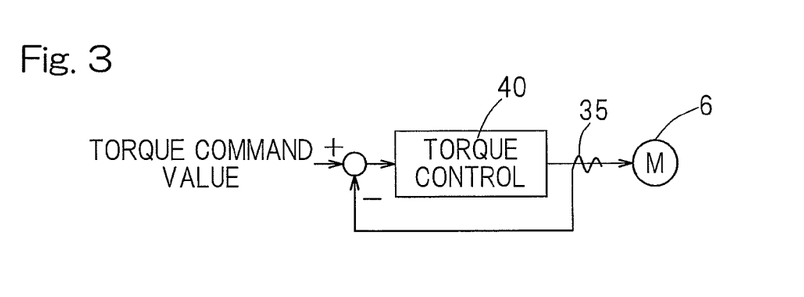
FIG. 3 is a block diagram of a control scheme that may be employed by a torque controller for the electric vehicle.

FIG. 3 shows a block diagram of a control scheme that may be employed by a torque controller 40 for the electric vehicle under discussion. The torque controller 40, which may control a motor drive current, may be configured to perform feedback control of the motor drive current based on a deviation between a detection value indicating a drive current applied to the motor unit 6, as derived from the current sensor 35, and a value indicating an accelerating/decelerating command or a torque command value generated by the drive control subunit 21a (FIG. 1). The motor drive controller 33 (FIG. 2) may be configured to obtain a rotational angle of a motor rotor of the motor unit 6, with the angle sensor 36, and perform a vector control.

Figure 4:
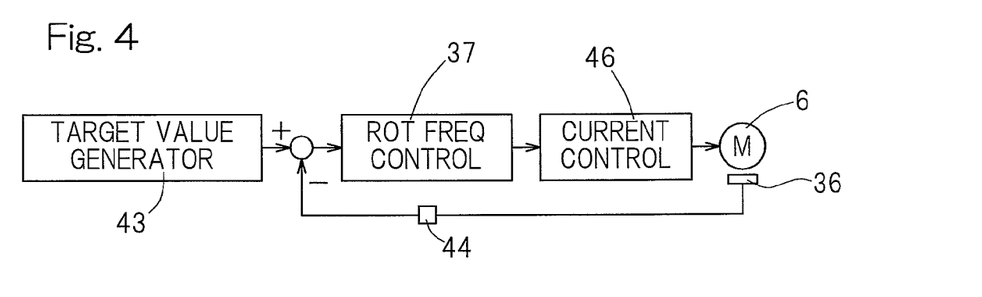
FIG. 4 is a block diagram of a control scheme that may be employed by a rotational frequency controller for the electric vehicle.

FIG. 4 shows a block diagram of a control scheme that may be employed by a rotational frequency controller 37 for the electric vehicle under discussion. The motor drive controller 33 may include a target value generator 43. The target value generator 43 may generate a target value, with the target value indicating a rotational frequency of the motor unit as measured when torque control is performed. Such a target value may indicate a rotational frequency of the motor unit that is the latest as of when it is determined that there is an abnormality of torque control, with the torque control being performed based on signals, such as an accelerating signal produced from the accelerator manipulation unit 16, that are the latest as of when such a determination is made.

Such a target value may be modified as necessary based on an accelerating/decelerating command for the motor unit 6 that may be in the form of a torque command. In a variant, such a target value may indicate a rotational speed of the motor unit for a given torque command value that is the latest as of when switching from torque control to rotational frequency control has been carried out. Such a target value according to the variant may be modified in proportion with the ratio of the latest torque command value relative to a torque command value that is the latest as of when the aforementioned target value indicating a rotational speed of the motor unit is generated. A target value may be constant regardless of an accelerating/decelerating command. The rotational frequency controller 37 may perform feedback control of rotational frequency based on a deviation between such a target value as discussed above and a detection value, as derived from the angle sensor 36, indicating rotational frequency of the motor unit. A differentiator 44 may receive an angle sensed by the angle sensor 36 to generate an angular speed. Thus, the aforementioned feedback control of rotational frequency may be performed based on a deviation between such an angular speed and a target value generated by the target value generator 43.

When switching from torque control to rotational frequency control is carried out for either one of the left and right rear wheels 2, 2, switching from torque control to rotational frequency control may also be carried out for the other one of the left and right rear wheels 2, 2. Such switching control may be carried out by a common inverter unit 22 or via different inverter units 22. Such switching control may be carried out via the ECU 21.

The rotational frequency controller 37 may produce a current command value for output. A current controller 46 may be provided which is configured to receive the current command value and generate a motor current corresponding to the current command value, with the corresponding motor current being supplied to the motor unit 6 to implement feedforward control of motor current. In the example under discussion, if the motor control circuitry 29 is caused to switch from torque control to rotational frequency control, the rotational frequency control may be performed such that a target value indicates a rotational frequency of the motor unit as measured during a normal operation when torque control is performed. The motor control circuitry 29 may further include a drive decrementor 45. The drive decrementor 45 may gradually reduce torque or rotational frequency of all of the motor units 6 of the illustrated vehicle, after switching from torque control to rotational frequency control performed by the rotational frequency controller 37 is carried out.

The abnormalities notifier 41 as shown in FIG. 2 may be configured to send information indicating abnormalities to the ECU 21, if the motor control circuitry 29 is caused to switch from torque control to rotational frequency control or if the torque control abnormalities detector 38 determines that there is an abnormality of torque control.

The abnormalities display controller 42, which may be included in the ECU 21, may be configured to, in response to the information indicating abnormalities of the motor unit 6 produced from the abnormalities notifier 41, cause a vehicle driver display 27 to show a presentation that indicates abnormalities. The presentation that can be shown on the display 27 may include a presentation with letters and/or symbols, such as an icon.

The following advantages or effects that may be achieved will be described with reference to FIG. 1 and FIG. 2. During a normal operation of the driving of an electric vehicle, the ECU 21 such as shown in FIG. 1 may generate a torque command value based on an accelerating signal produced from the accelerator manipulation unit 16, a decelerating signal produced from the brake manipulation unit 17, and a cornering signal produced from the steering angle sensor 15. The motor control circuitry 29 may perform torque control based on such a torque command value that may be produced from the ECU 21. The torque control abnormalities detector 38 such as shown in FIG. 2 may be ready at any time to detect an abnormality of torque control. The control mode switcher 39 such as shown in FIG. 2 may, in response to determination by the torque control abnormalities detector 38 that there is an abnormality of torque control, cause the motor control circuitry 29 to switch from torque control to rotational frequency control performed by the rotational frequency controller 37. In particular, the torque control abnormalities detector 38 may be configured to determine that there is an abnormality of torque control, if there is a failure of torque control due to, for example, a damage to the current sensor 35 configured to sense a motor current. The control mode switcher 39 may, in response to such a determination, cause the motor control circuitry 29 to switch from torque control to rotational frequency control. In this way, appropriate measures or actions can be quickly taken when there is a failure of torque control.

The provision of a drive decrementor 45 which may gradually reduce torque or rotational frequency of all of the motor units 6 of the vehicle, after switching from torque control to rotational frequency control performed by the rotational frequency controller 37 is carried out allows for gradually reducing, in response to an abnormality, torque or rotational frequency of the motor units 6, thus allowing a driver to, for example, pull over to the side of a road on his/her own or continue driving the vehicle on his/her own to some place where the vehicle can be fixed such as a repair shop. Then, the electric vehicle may be repaired so as to be ready to perform torque control.

In the aforementioned configuration, the motor control circuitry 29 of the inverter unit 22 includes the torque control abnormalities detector 38. In this way, the torque control abnormalities detector 38 that may determine if there is an abnormality of torque control is positioned closer to the motor unit 6 than in a configuration where the ECU 21 includes the torque control abnormalities detector 38, thus the former configuration being more advantageous in terms of wire routing. Also, with the former configuration, an appropriate control can be initiated more quickly than with a configuration of the ECU 21 including the torque control abnormalities detector 38, thus promptly avoiding various driving problems. Furthermore, with the former configuration, the load on the ECU 21, whose complexity is increasing hand-in-hand with its sophistication, can be reduced.

The ECU 21 performs general, integrated control of the vehicle. Thus, by sending to the ECU 21a notification of abnormalities of torque control if the torque control abnormalities detector 38 detects an abnormality of torque control, the ECU 21 can correspondingly perform an appropriate control of the vehicle in general. For instance, the ECU 21 may, if an abnormality occurs in only one of the traction motor units 6, 6 of the illustrated left and right wheels, command the drive decrementor 45 to gradually reduce torque or rotational frequency of both of the traction motor units 6, 6 of the illustrated left and right wheels simultaneously. Also, the ECU 21 is an upper-level control unit which may send a drive command to the inverter unit 22. Thus, an urgent control performed by the inverter unit 22 may be followed by a more appropriate control of drive which is performed by the ECU 21.

Reliability of a wheel bearing unit 4, a reducer unit 7 and a motor unit 6 is an urgent concern for an in-wheel motor drive system 8 which, due to its smaller size, involves rapid rotation of the motor unit 6, and etc. Switching, if there is a failure of torque control of one or both of the traction motor units 6, 6 of the illustrated left and right wheels, from torque control to rotational frequency control of the one or both of the traction motor units 6, can prevent abrupt stopping of the driving of the one or both of the traction motor units 6, thus allowing a driver to, for example, continue driving the vehicle to some place where the vehicle can be fixed. Then, the electric vehicle may be repaired so as to be ready to perform torque control.

In the aforementioned configuration, the reducer unit 7 in the in-wheel motor drive system 8 may include a cycloidal reducer having, for example, a reduction ration of ⅙ or greater. This allows for the provision of a smaller motor unit 6, thus achieving reduction in dimensions of the system or assembly. With such a significant reduction ratio, a smaller motor unit 6 may involve rapid rotation. Even when a failure of torque control of a motor unit 6 occurs during rapid rotation of the motor unit 6, the motor control circuitry 29 may be caused to switch from torque control to rotational frequency control, thus preventing problems such as abrupt stopping of the driving of the motor unit 6.

Figure 6:
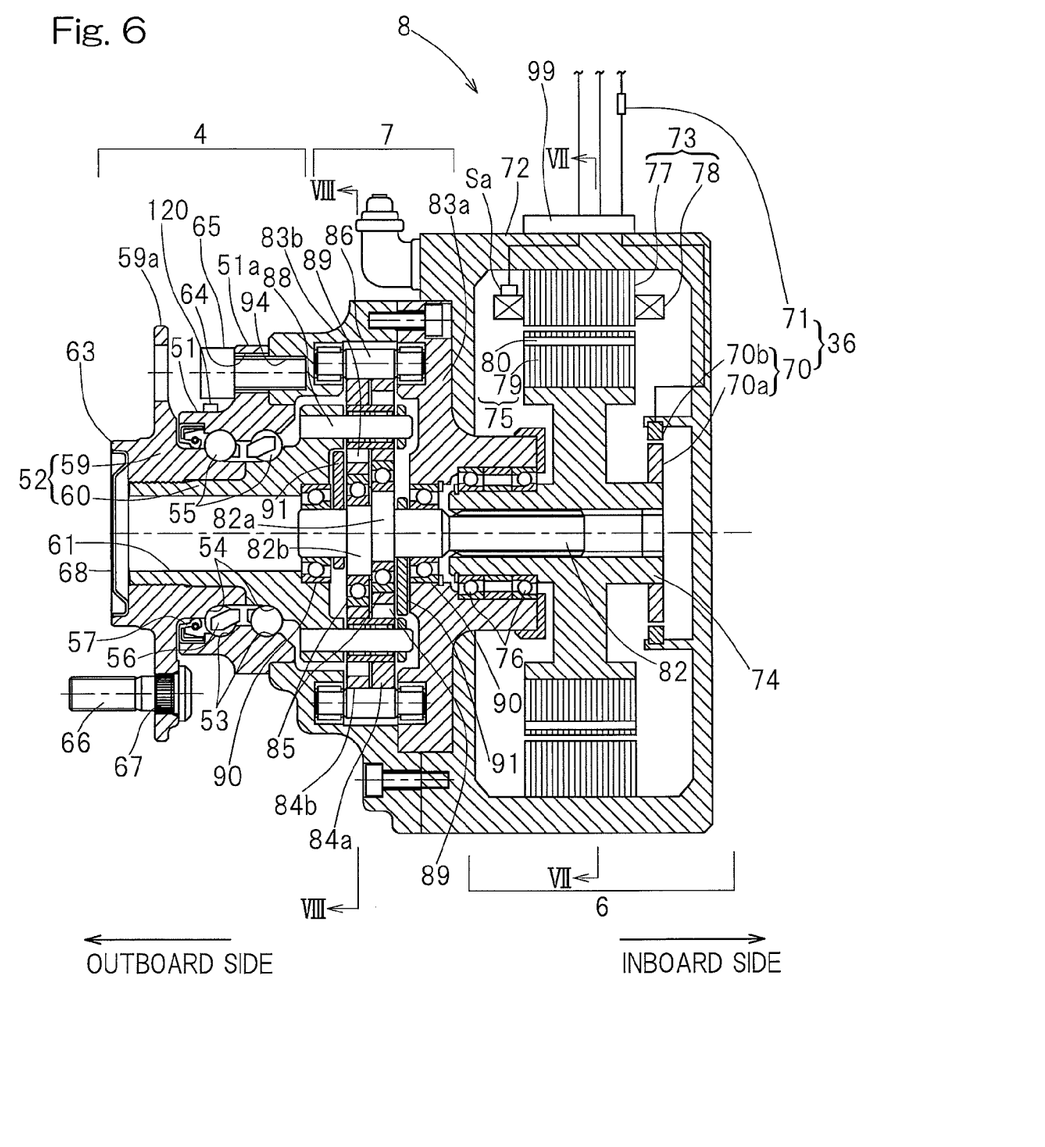
FIG. 6 is a front cut-away view of an in-wheel motor drive system for the electric vehicle.

As shown in FIG. 6, the in-wheel motor drive system 8 includes a wheel bearing unit 4, a motor unit 6 and a reducer unit 7 interposed between the wheel bearing unit 4 and the motor unit 6, in which the hub of a drive wheel 2 (FIG. 2) supported by the wheel bearing unit 4 is coaxially coupled with a rotational output shaft 74 of the motor unit 6 (FIG. 6). Preferably, the reducer unit 7 has a reduction ratio of ⅙ or greater. The illustrated reducer unit 7 includes a cycloidal reducer which includes a rotational input shaft 82 coaxially connected to the rotational output shaft 74 of the motor unit 6. The rotational input shaft 82 has eccentric segments 82a, 82b. The cycloidal reducer also includes curvilinear plates 84a, 84b mounted via respective bearings 85 to the eccentric segments 82a, 82b, in such a way to transmit the eccentric motions of the curvilinear plates 84a, 84b in the form of a rotary motion to the wheel bearing unit 4. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel bearing unit 4 includes an outer member 51 having an inner periphery formed with a plurality of rows of raceway surfaces 53, an inner member 52 having an outer periphery formed with raceway surfaces 54 held in face to face relation to those raceway surfaces 53, and a plurality of rows of rolling elements 55 that are interposed between the raceway surfaces 53 of the outer member 51 and the raceway surfaces 54 of the inner member 52. The inner member 52 concurrently serves as a hub for mounting a drive wheel. The illustrated wheel bearing unit 4 includes a double row angular contact ball bearing, in which the rolling elements 55 are in the form of balls rollingly retained by a retainer 56 that is provided one for each row of the balls. The raceway surfaces 53 and 54 have arcuate cross sectional shapes and are formed to have respective contact angles held in back-to-back relation with each other. The outer member 51 and the inner member 52 define an annular bearing space therebetween, and an outboard end of the annular bearing space is sealed by a sealing member 57.

The outer member 51, which serves as a stationary member, is of one piece construction having a flange 51a for attaching to an outboard housing 83b of the reducer unit 7. The flange 51a has bolt insertion holes 64 formed at a plurality of circumferential locations thereof. The housing 83b has bolt receiving holes 94 that are internally threaded at locations thereof corresponding to the respective bolt insertion holes 64. The outer member 51 can be mounted to the housing 83b by screwing into the bolt receiving holes 94 the mounting bolts 65 that are pre-inserted in the bolt insertion holes 64.

The inner member 52, which serves as a rotational member, includes an outboard member 59 having a hub flange 59a for attaching a wheel. The inner member 52 also includes an inboard member 60 which has an outboard side fitted to an inner periphery of the outboard member 59 and which is crimped to be integrated with the outboard member 59. The outboard member 59 and the inboard member 60 have the corresponding rows of the raceway surfaces 54 formed thereon. The inboard member 60 has a center thereof formed with a through bore 61. The hub flange 59a has force-fitting holes 67 at a plurality of circumferential locations thereof for receiving corresponding hub bolts 66. The outboard member 59 has a cylindrical pilot portion 63 for guiding a drive wheel and brake components (both not shown), which is located in the vicinity of the root of the hub flange 59a of the outboard member 59 and is protruding towards the outboard side. A cap 68 closing an outboard end of the through bore 61 is fitted to an inner periphery of the pilot portion 63.

The illustrated motor unit 6 includes a radial-gap type, IPM motor (e.g., an Interior Permanent Magnet synchronous motor) that includes a motor stator 73 fitted to a cylindrical motor housing 72 and also includes a motor rotor 75 mounted to the rotational output shaft 74, with a radial gap provided between the motor stator 73 and the motor rotor 75. The rotational output shaft 74 is cantilevered via two bearings 76 to a cylindrical segment of the inboard housing 83a of the reducer unit 7.

Figure 7:
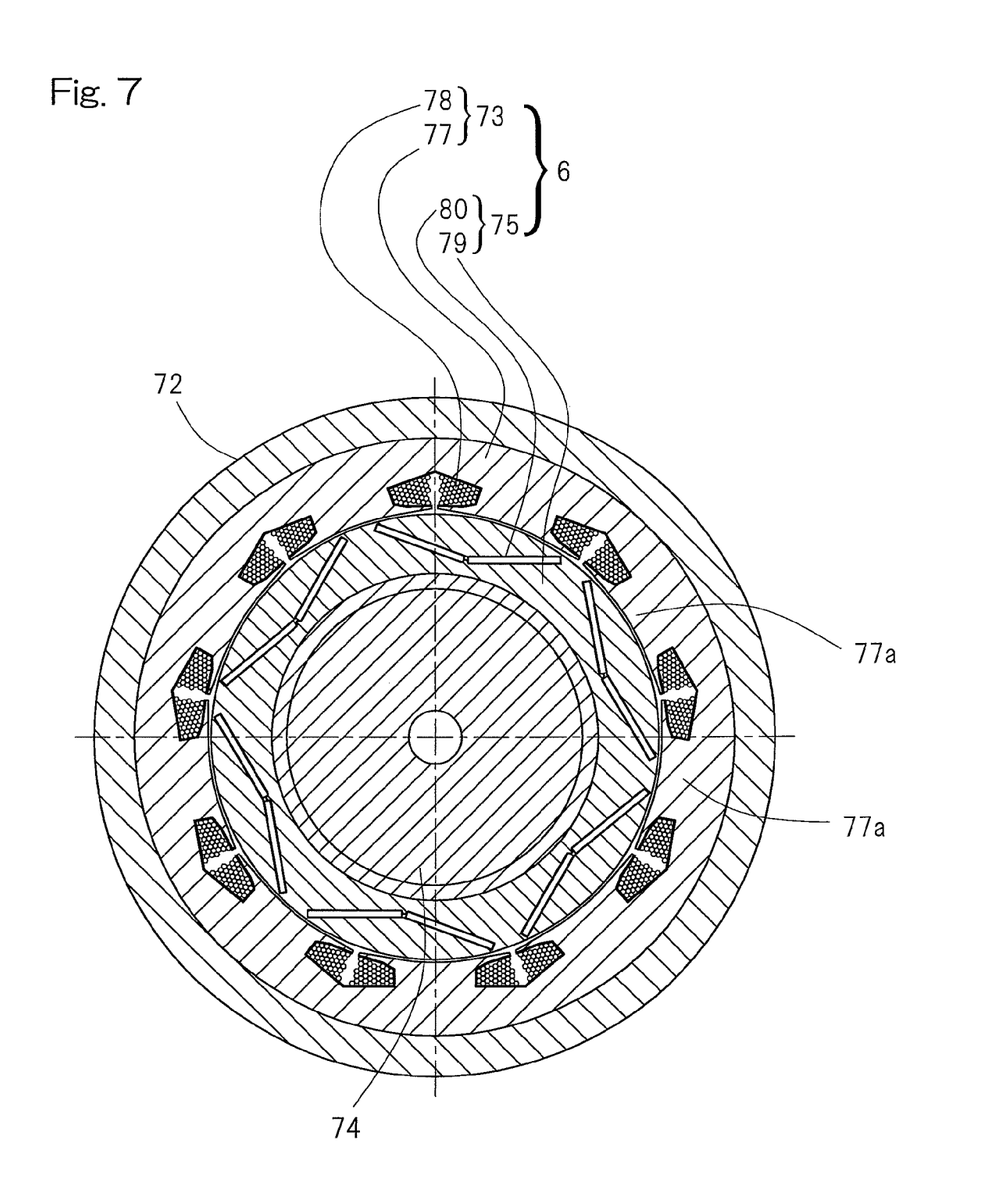
FIG. 7 is a longitudinal cross sectional view of FIG. 6 taken along the line VII-VII, illustrating a motor.

FIG. 7 shows a longitudinal cross sectional view of a motor (taken along the line VII-VII in FIG. 6). The motor rotor 75 of the motor unit 6 may include a rotor core body 79 made of soft magnetic material and may also include a permanent magnet structure 80 incorporated in the rotor core body 79. The permanent magnet structure 80 may include permanent magnets including pairs of two neighboring opposed permanent magnets arranged in circular fashion in the rotor core body 79, where, in each of the pairs, the distance between two neighboring opposed permanent magnets increases along a length of the opposed permanent magnets, as viewed in a cross section thereof. The permanent magnet structure 80 may include a neodymium magnet. The motor stator 73 may include a stator core body 77 made of soft magnetic material and may also include coils 78. The stator core body 77 has a ring-shaped outer peripheral surface having a circular cross section. The stator core body 77 also has an inner peripheral surface having a circumferentially arranged plurality of teeth 77a formed therein that are protruding radially inwards. The coils 78 are wound around the corresponding teeth 77a of the stator core body 77.

The motor unit 6 as shown in FIG. 6 is associated with an angle sensor 36 configured to sense a rotational angle of the motor rotor 75 relative to the motor stator 73. The angle sensor 36 includes an angle sensor body 70 configured to sense signals representing a rotational angle of the motor rotor 75 relative to the motor stator 73 for output and also includes an angle calculation circuit 71 configured to calculate a rotational angle based on the signals produced from the angle sensor body 70. The angle sensor body 70 includes a detectable element 70a associated with the outer peripheral surface of the rotational output shaft 74 and also includes a detector element 70b associated with the motor housing 72. For example, the detector element 70b may be positioned adjacent the detectable element 70a in a radially opposed fashion.

The detectable element 70a and the detector element 70b may be positioned adjacent each other in an axially opposed fashion. Here, the angle sensor 36 may include a resolver. To maximize the efficiency of the illustrated motor unit 6, a motor drive controller 33 of a motor control circuitry 29 may be configured to control the timings at which respective phase alternating currents are supplied to the coils 78 of the motor stator 73, based on the rotational angle of the motor rotor 75 relative to the motor stator 73 as sensed by the angle sensor 36.

A connector 99 may be formed at the motor housing 72 for connection of the wires for a motor current in the in-wheel motor drive system 8, wires for various sensors, wires for various commands, and etc.

Figure 8:
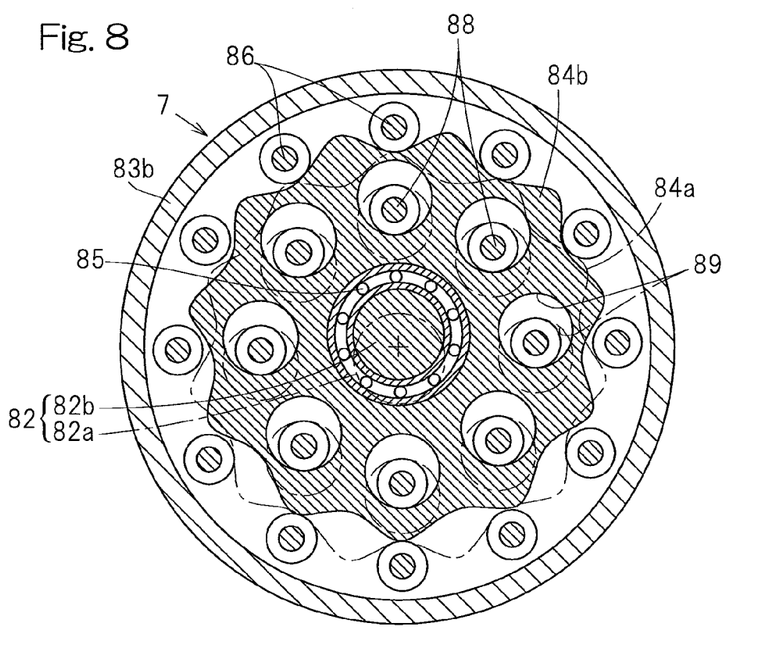
FIG. 8 is a cross sectional view of FIG. 6 taken along the line VIII-VIII, illustrating a reducer.

The illustrated reducer unit 7 includes a cycloidal reducer as described. As shown in FIG. 8, the cycloidal reducer includes two curvilinear plates 84a, 84b, each having an outer contour defined by a smoothly corrugated trochoidal curve, that are mounted via respective bearings 85 to the eccentric segments 82a, 82b of the rotational input shaft 82. A plurality of outer pins 86 are fitted to the housing 83b to directly or indirectly guide, along the outer peripheries thereof, the eccentric motions of the curvilinear plates 84a and 84b. A plurality of inner pins 88, which are fitted to the inboard member 60 of the inner member 52, are inserted to a plurality of corresponding, round through holes 89 formed in each of the curvilinear plates 84a and 84b, to directly or indirectly engage with the through holes 89. The rotational input shaft 82 is splinedly connected to the rotational output shaft 74 of the motor unit 6 for co-rotation. The rotational input shaft 82 as shown in FIG. 6 is supported on both sides thereof, via two bearings 90, by an inboard housing 83a and by an inner diameter surface of the inboard member 60 of the inner member 52.

Rotation of the rotational output shaft 74 of the motor unit 6 causes the curvilinear plates 84a, 84b, associated with the rotational input shaft 82 that co-rotates with the rotational output shaft 74, to make eccentric motions. The eccentric motions of the curvilinear plates 84a, 84b are, through the inner pins 88 directly or indirectly engaging with the through holes 89, transmitted in the form of a rotary motion to the inner member 52. The speed of rotation of the inner member 52 is reduced with respect to that of rotation of the rotational output shaft 74. For example, a single-stage reducer unit having such a configuration can achieve a reduction ratio of $\frac{1}{10}$ or greater.

The two curvilinear plates 84a, 84b are mounted, 180° out of phase with each other, to the eccentric segments 82a and 82b of the rotational input shaft 82, so that the eccentricity of the motions of the curvilinear plates 84a, 84b can be cancelled. Counterweights 91 associated with the respective eccentric segments 82a, 82b, are each disposed at a side of the corresponding one of the eccentric segments 82a, 82b, in such a way that the counterweights 91 face each other across the eccentric segments 82a, 82b while each of the counterweights 91 being displaced in a direction opposite to the direction of displacement of the corresponding one of the eccentric segments 82a, 82b. In this way, vibrations that may be caused by the curvilinear plates 84a, 84b can be cancelled out.

Figure 9:
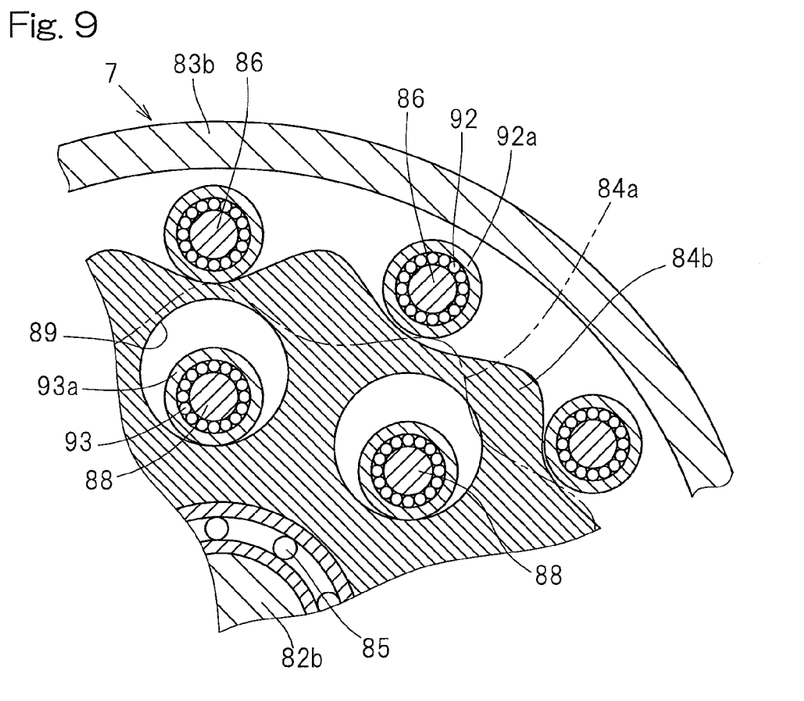
FIG. 9 is a fragmentary enlarged cross sectional view of FIG. 8.

As shown on an enlarged scale in FIG. 9, bearings 92 and bearings 93 may be fitted to the outer pins 86 and the inner pins 88, respectively. The outer rings 92a of the bearings 92 are in rolling contact with the outer peripheries of the curvilinear plates 84a, 84b, while the outer rings 93a of the bearings 93 are in rolling contact with the inner peripheries of the through holes 89. This can minimize the contact friction between the outer pins 86 and the outer peripheries of the curvilinear plates 84a, 84b and the contact friction between the inner pins 88 and the inner peripheries of the through holes 89, thus allowing for smoother transmission of the eccentric motions of the curvilinear plates 84a, 84b in the form of a rotary motion to the inner member 52.

The wheel bearing unit 4 of the in-wheel motor drive system 8 as shown in FIG. 6 is secured to a vehicle body through the connection between a suspension system (not shown) such as a knuckle and the housing 83b of the reducer unit 7 or an outer periphery of the housing 72 of the motor unit 6.

Although the present invention has been described in connection with preferred embodiments with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE SIGNS

2: Wheel
4: Wheel bearing unit
6: Motor unit
7: Reducer unit
8: In-wheel motor drive system
19: Battery unit
21: ECU
22: Inverter unit
28: Power circuitry
29: Motor control circuitry
31: Inverter
36: Angle sensor
37: Rotational frequency controller
38: Torque control abnormalities detector
39: Control mode switcher
41: Abnormalities notifier
43: Target value generator
45: Drive decrementor

What is claimed is:

1. An electric vehicle comprising:
a motor unit configured to drive a wheel;
an ECU which is an electronic control unit configured to perform general control of the vehicle;
an inverter unit, the inverter unit including:
  a power circuitry including an inverter configured to convert a DC power into an AC power used to drive the motor unit; and
  a motor control circuitry configured to control at least the power circuitry in accordance with control from the ECU, the ECU being configured to send to the inverter unit a torque command value that causes the motor unit to be driven, and the motor control circuitry of the inverter unit being operable to perform torque control;
  a rotational frequency controller operable to perform rotational frequency control, the motor control circuitry including the rotational frequency controller;
  a torque control abnormalities detector configured to detect an abnormality of torque control performed by the motor control circuitry; and
  a control mode switcher configured to, in response to determination by the torque control abnormalities detector that there is an abnormality of torque control, cause the motor control circuitry to switch from torque control to rotational frequency control performed by the rotational frequency controller; and
a target value generator configured to generate a target value, the target value indicating a rotational frequency of the motor unit that is the latest as of when the motor control circuitry is caused to switch from torque control to rotational frequency control,
wherein the rotational frequency controller is configured to perform feedback control of rotational frequency based on a deviation between the target value and a detection value as derived from a sensor configured to determine rotational frequency of the motor unit.

2. The electric vehicle as claimed in claim 1, wherein the torque control abnormalities detector is configured to determine that there is an abnormality of torque control, if a measurement of a motor current for a given torque command value produced from the ECU falls outside a predefined range for the given torque command value.

3. The electric vehicle as claimed in claim 1, further comprising:
a drive decrementor configured to gradually reduce torque or rotational frequency of all of the motor units of the vehicle, after switching from torque control to rotational frequency control performed by the rotational frequency controller is carried out.

4. The electric vehicle as claimed in claim 1, wherein the inverter unit includes an abnormalities notifier configured to send to the ECU a notification of abnormalities of the motor unit, if the motor control circuitry is caused to switch from torque control to rotational frequency control.

5. The electric vehicle as claimed in claim 1, further comprising:
a wheel bearing unit; and
a reducer unit,
wherein the motor unit, together with the wheel bearing unit and the reducer unit, forms an in-wheel motor drive system that is partly or entirely disposed within the wheel.

6. The electric vehicle as claimed in claim 1, further comprising:
a reducer unit configured to produce rotation with a speed that is reduced with respect to that of rotation of the motor unit,
wherein the reducer unit comprises a cycloidal reducer.

* * * * *